(12) United States Patent
Yamagami et al.

(10) Patent No.: US 8,798,557 B2
(45) Date of Patent: Aug. 5, 2014

(54) FORMING METHOD USING PRESSING AND INJECTION-MOLDING MULTIFUNCTION DIE, FORMING APPARATUS PROVIDED WITH PRESSING AND INJECTION-MOLDING MULTIFUNCTION DIE, AND METAL-RESIN MOLDED PRODUCT FORMED BY THE METHOD OR THE APPARATUS

(75) Inventors: Nobuyuki Yamagami, Kasukabe (JP); Syuji Ichihashi, Koga (JP); Hiroaki Sakurai, Koga (JP); Mitsuru Mori, Koga (JP)

(73) Assignee: Kyosan Denki Co., Ltd., Koga (JP)

( * ) Notice: Subject to any disclaimer, the term of this patent is extended or adjusted under 35 U.S.C. 154(b) by 463 days.

(21) Appl. No.: 12/923,437

(22) Filed: Sep. 21, 2010

(65) Prior Publication Data
US 2011/0008479 A1 Jan. 13, 2011

Related U.S. Application Data

(62) Division of application No. 12/216,302, filed on Jul. 2, 2008, now Pat. No. 7,837,920.

(30) Foreign Application Priority Data

Jul. 5, 2007 (JP) ................... 2007-177579
Jun. 24, 2008 (JP) ................... 2008-163915

(51) Int. Cl.
*B29C 45/16* (2006.01)

(52) U.S. Cl.
USPC .......................... 455/111; 425/553

(58) Field of Classification Search
USPC ....................................... 425/111
See application file for complete search history.

(56) References Cited

U.S. PATENT DOCUMENTS

2006/0003040 A1* 1/2006 Sicilia .......................... 425/130
2007/0138697 A1* 6/2007 Takeda et al. ................. 264/278

FOREIGN PATENT DOCUMENTS

| JP | B2-8-2557 | 1/1996 |
| JP | A-2000-215962 | 8/2000 |
| JP | A-2001-293744 | 10/2001 |
| JP | 2004074619 A * | 3/2004 |
| JP | A-2006-88558 | 4/2006 |

OTHER PUBLICATIONS

English abstract of JP2004074619A.*
English abstract of JP2004074619A, 2004.*
Sep. 1, 2009 Office Action issued in U.S. Appl. No. 12/216,302.
Mar. 11, 2010 Office Action issued in U.S. Appl. No. 12/216,302.
Jul. 14, 2010 Notice of Allowance issued in U.S. Appl. No. 12/216,302.
Dec. 1, 2011 Office Action issued in Japanese Patent Application No. 2008-163915 (with translation).

* cited by examiner

*Primary Examiner* — Larry Thrower
*Assistant Examiner* — Xue Liu
(74) *Attorney, Agent, or Firm* — Oliff PLC

(57) ABSTRACT

A forming method using a pressing and injection-molding multifunction die for forming a metal-resin molded product by integrating metal with resin, includes: forming a resin-molded portion on the metal; and performing, after the resin-molded portion is formed on the metal, at least one of a pressing process and an injection-molding process on the metal in the state in which the metal-resin molded product is supported by only the resin.

4 Claims, 5 Drawing Sheets

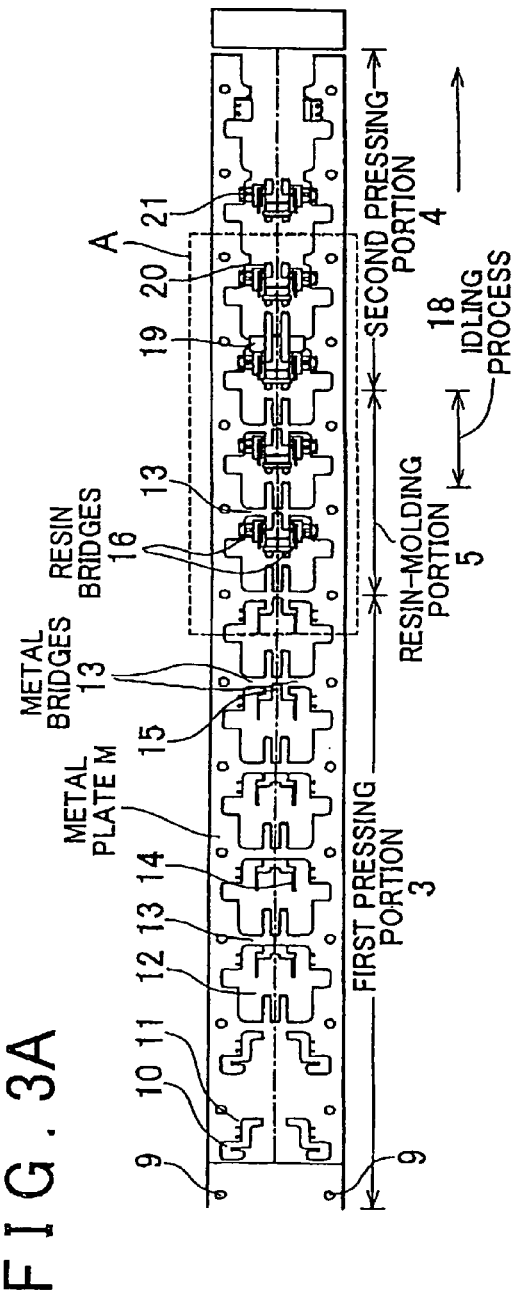
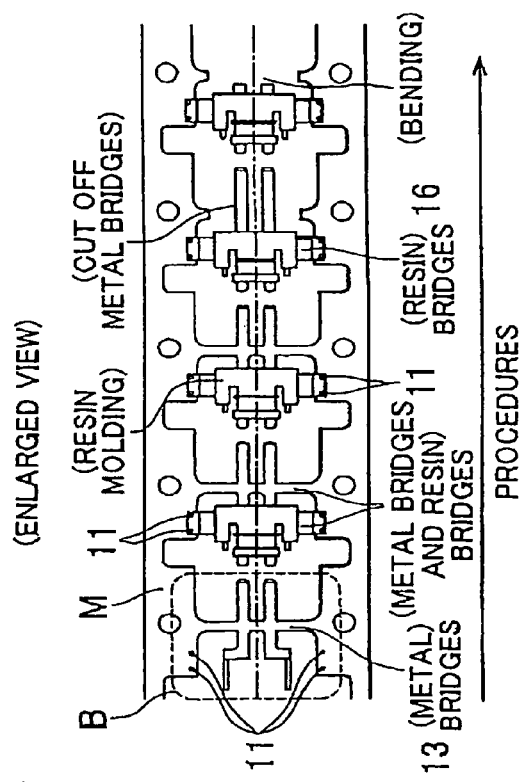
FIG. 3A
FIG. 3B

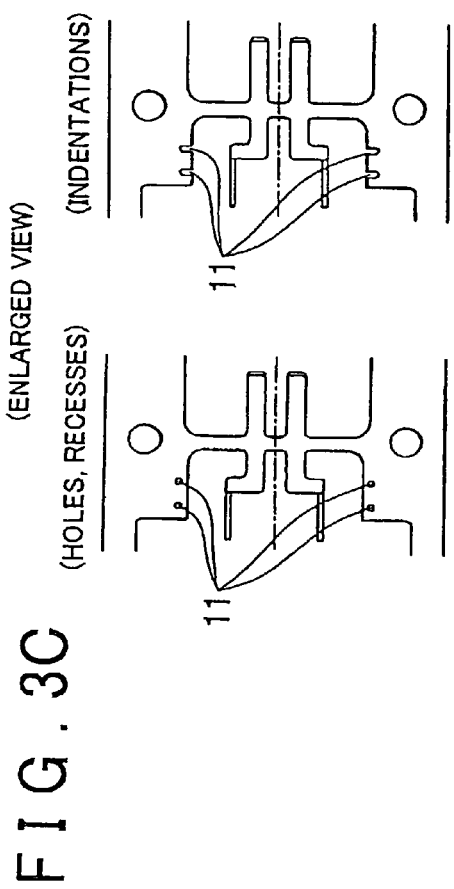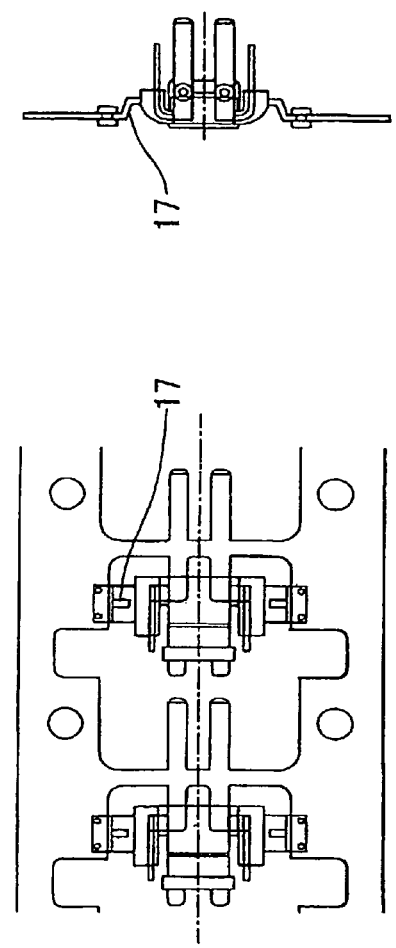

FORMING METHOD USING PRESSING AND INJECTION-MOLDING MULTIFUNCTION DIE, FORMING APPARATUS PROVIDED WITH PRESSING AND INJECTION-MOLDING MULTIFUNCTION DIE, AND METAL-RESIN MOLDED PRODUCT FORMED BY THE METHOD OR THE APPARATUS

INCORPORATION BY REFERENCE

This is a Division of application Ser. No. 12/216,302 filed Jul. 2, 2008, which claims the benefit of Japanese Patent Applications No. 2007-177579 and No. 2008-163915 filed on Jul. 5, 2007 and Jun. 24, 2008. The disclosures of the prior applications are hereby incorporated by reference herein in their entirety.

BACKGROUND OF THE INVENTION

1. Field of the Invention

The invention relates to a forming method and forming apparatus for forming, using a pressing and injection-molding multifunction die, metal-resin molded products, and a metal-resin molded product that is formed by the method or the apparatus described above. More specifically, the invention relates to a forming method and forming apparatus for forming, using a pressing and injection-molding multifunction die, metal-resin molded products, for example, connectors with terminal pins, in which one end portions of multiple metal terminal pins droop from one end of a resin chip and the other end portions of the multiple metal terminal pins, which extend from the other end of the resin chip, are bent in the direction perpendicular to the resin chip.

2. Description of the Related Art

According to an existing hoop forming technology, metal-resin molded products, which are formed by integrating metal with resin, are produced successively in a continuous forming process as shown in FIG. 4. In this continuous forming process, first, a metal plate M is pulled out of a supply reel L on which the metal plate M is wound. Then, the metal plate M is inserted into a press die of a press forming device P1, punch-pressed, and rolled up in a hoop manner in a zone A. Next, the punch-pressed metal plate M, which is in the form of semi-finished products at this stage, is inserted into an injection-molding die of a resin-molding device Q, and resin-molded portions are formed on predetermined portions of the metal plate M, whereby the metal plate M, which is in the form of semi-finished products at this stage, is integrated with the resin. The punch-pressed metal plate M integrated with the resin is rolled up in a hoop manner in a zone B. After that, the punch-pressed metal plate M with the resin is inserted into a press die of a press forming device P2 and pressed. Finally, finished metal-resin molded products are cut out from the metal plate M.

Japanese Examined Patent Application Publication No. 08-2557 (JP-B-08-2557) describes a technology related to an insert molding method and insert molding apparatus for processing metal and resin in an integrated fashion. According to the insert molding method, a metal insert member, which is supplied by continuous conveyance, is pressed, undergoes resin-molding, and is then cut at regular intervals, whereby insert molded products are successively produced. The metal insert member is pressed and cut at an opening/closing portion that is formed integrally with a molding die, used for resin molding, and that opens and closes in accordance with an opening/closing operation of the molding die.

In the insert molding apparatus according to JP-B-08-2557, the molding die, which opens and closes, is provided with a resin-molding portion. The resin-molding portion forms a resin-molded portion on the insert member, which is supplied by continuous conveyance from one side to the other side of the resin-molding portion. A pressing portion is provided at least at a position upstream of the resin-molding portion in the direction in which the insert member is conveyed, and a cutting portion is provided at a position downstream of the resin-molding portion in the direction in which the insert member is conveyed. In accordance with the opening/closing operation of the molding die, a resin-molded portion is formed on the insert member at a first predetermined position by the resin-molding portion, the insert member is pressed at a second predetermined position by the pressing portion, and the insert member is cut at a third predetermined position by the cutting portion at the same time. In this way, insert molded products that are pressed are successively produced by opening/closing the molding die and conveying the insert member.

However, in an insert molding method and insert molding apparatus according to related art, in order to convey semi-finished products, the metal plate needs to be conveyed with links (metal bridges) left in some portions of the metal plate. Therefore, the metal bridges need to be left in the metal plate until the final process. The presence of the metal bridges causes problems such as restriction on positions at which metal portions are bent and formation of steps in cutting surfaces that are formed after the metal bridges are cut off. According to the technology described in JP-B-08-2557, semi-finished products are connected to the metal plate by metal bridges, and the insert member is continuously delivered to the pressing portion, the resin-molding portion and the cutting portion sequentially, whereby the products are formed. The insert molding apparatus described in JP-B-08-2557 has other problems that the structure thereof is a considerably complicated and the apparatus is expensive.

SUMMARY OF THE INVENTION

The invention provides a forming method using a pressing and injection-molding multifunction die and a forming apparatus provided with a pressing and injection-molding multifunction die, with which restriction on a position at which a metal portion is bent is removed and a more compact metal-resin molded product is formed by changing, after a resin-molded portion is formed on the metal portion, links used to convey products from metal bridges to resin bridges that are formed during an injection-molding process.

A first aspect of the invention relates to a forming method using a pressing and injection-molding multifunction die for forming a metal-resin molded product by integrating metal with resin. The forming method includes: forming a resin-molded portion on the metal; and performing, after the resin-molded portion is formed on the metal, at least one of a pressing process and an injection-molding process on the metal in a state in which the metal-resin molded product is supported by only the resin.

According to the first aspect of the invention, after the resin-molded portion is formed on the metal portion, at least one of the pressing process and the injection-molding process is performed on the metal in the state in which the metal-resin molded product is supported by only the resin. As a result, restriction on the position at which the metal portion is processed is removed.

A second aspect of the invention relates to a forming apparatus provided with a pressing and injection-molding multifunction die that forms a metal-resin molded product by integrating metal with resin. The forming apparatus includes: a pressing portion that processes the metal; and a resin-molding portion that integrates the metal with resin so that the metal-resin molded product is supported by the resin.

With the configuration described above, various processes such as punch-pressing, bending, twisting and swaging are performed on the metal in the state in which the inserted metal is supported by only the resin. As a result, restriction on the position at which the metal portion is processed is removed, and more compact product is produced.

A third aspect of the invention relates to a metal-resin molded product that is formed according to the forming method described above.

According to the aspects of the invention described above, it is possible to achieve considerably high processing accuracy, perform complicated process, and produce an inexpensive metal-resin molded product.

BRIEF DESCRIPTION OF THE DRAWINGS

The foregoing and further features and advantages of the invention will become apparent from the following description of an example embodiment with reference to the accompanying drawings, wherein the same or corresponding portions are denoted by the same reference numerals and wherein:

FIGS. 3A to 3E are views illustrating the procedures for forming metal-resin molded products using the forming apparatus according to the embodiment of the invention, FIG. 3A illustrating a partially-omitted plan view, FIG. 3B illustrating an enlarged plan view showing a portion A in FIG. 3A, FIG. 3C illustrating an enlarged plan view showing a portion B in FIG. 3B, FIG. 3D illustrating a plan view showing resin bridge portions, and FIG. 3E illustrating a side view of the resin bridge portions in FIG. 3D.

DETAILED DESCRIPTION OF EXAMPLE EMBODIMENT

Hereafter, a forming apparatus provided with a multifunction die according to an example embodiment of the invention will be described with reference to the accompanying drawings.

The forming apparatus provided with a pressing and injection-molding multifunction die according to the embodiment of the invention is used to successively form metal-resin molded products (hereinafter, referred to as "molded products" where appropriate) such as connectors with terminal pins in a hoop forming process. In each connector with terminal pins, one end portions of multiple metal terminal pins droop from one end of a resin chip and the other end portions of the multiple metal terminal pins, which extend from the other end of the resin chip, are bent in the direction perpendicular to the resin chip.

Figure 1:
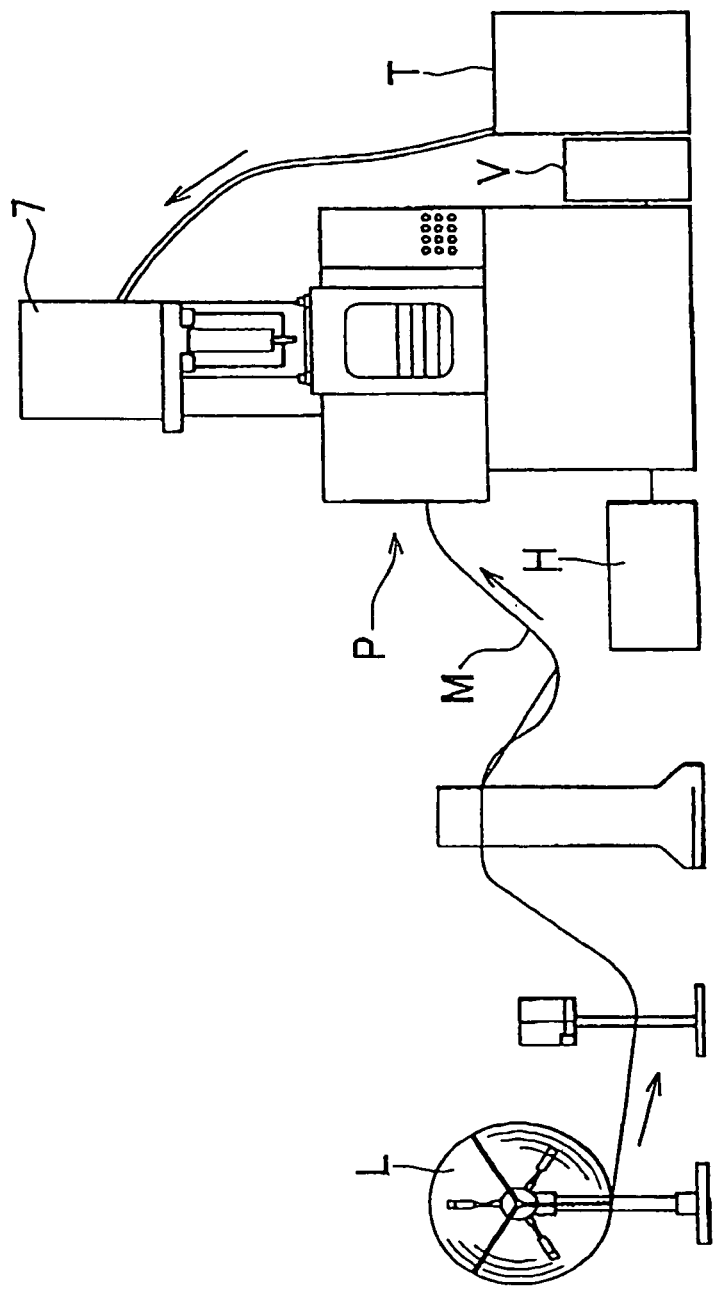
FIG. 1 is a view schematically showing the structure of a forming apparatus provided with a multifunction die according to an embodiment of the invention.

As shown in FIG. 1, the forming apparatus includes a supply reel L on which a metal plate M is wound in a hoop manner; a forming device P that has a multifunction die (hereinafter, referred to as "forming device P" where appropriate) into which the metal plate M that is pulled out of the supply reel L is inserted by a metal plate delivery device and which forms molded products, a resin dryer T that is provided with a conveying roller which is used to deliver a resin member into the forming device P, a temperature controller V that controls the temperature of the entirety of the multifunction forming die of the forming device P, and a hot runner controller H that suppresses formation of runner (unnecessary solidified-resin) in the forming device P.

Figure 2A:
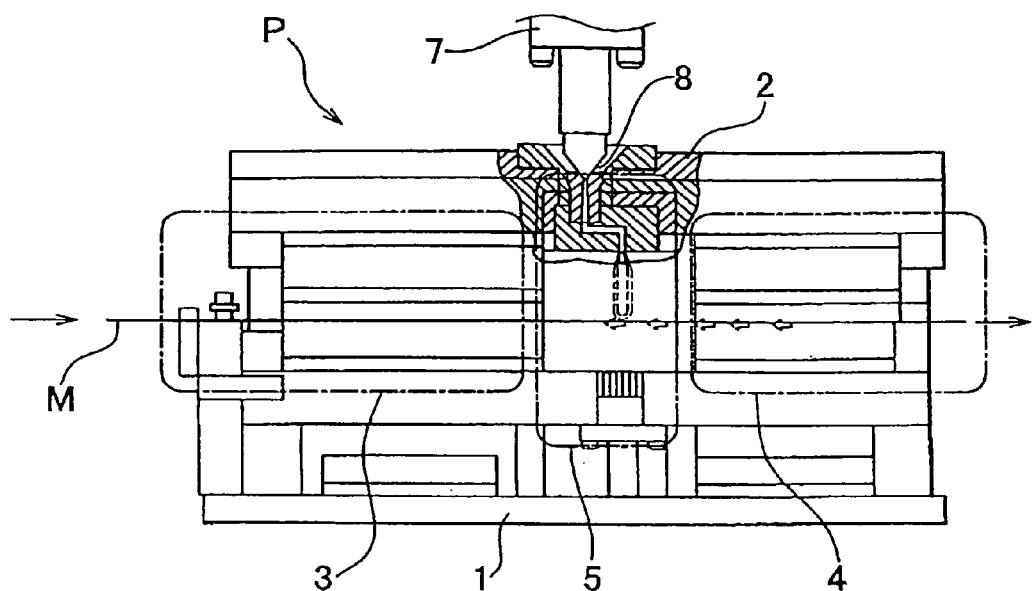
FIG. 2A is a partially-omitted cross-sectional view showing a state in which the multifunction die of the forming apparatus according to the embodiment of the invention is closed.
Figure 2B:
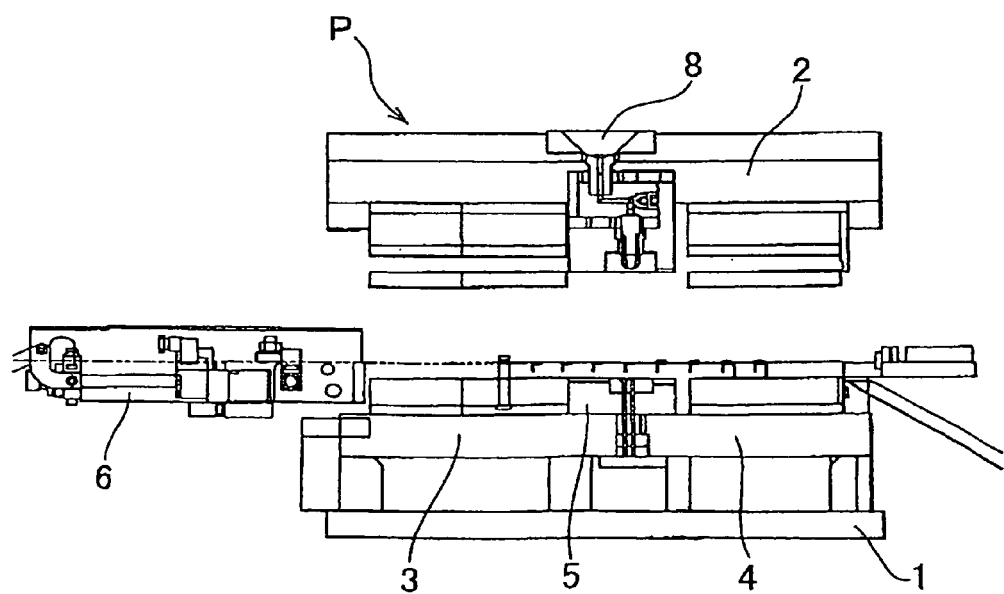
FIG. 2B is a partially-omitted cross-sectional view showing a state in which the multifunction die of the forming apparatus according to the embodiment of the invention is opened.
Figure 4:
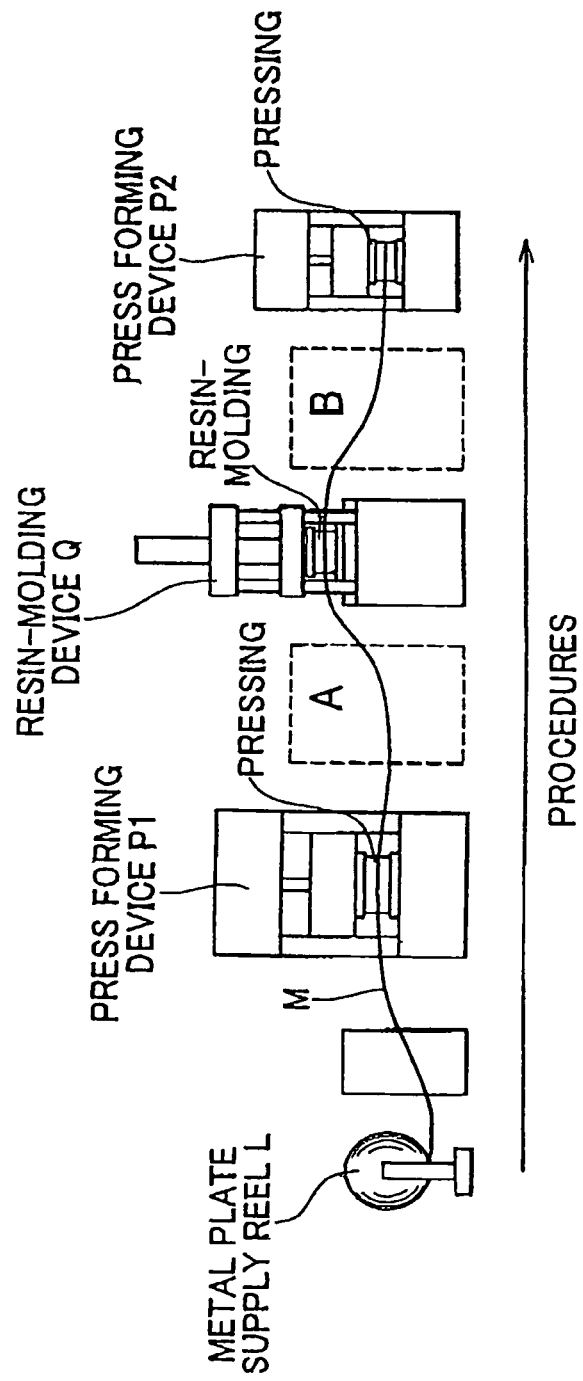
FIG. 4 is a view schematically showing the structure of a press-mold forming apparatus according to related art.

As shown in FIGS. 2A and 2B, in the forming device P, a movable upper die 2 is allowed to move upward and downward with respect to a lower stationary die 1. The metal plate M is intermittently inserted between the upper die 2 and the lower die 1 in accordance with timings at which the movable die 2 moves upward and downward. Each of the faces of the dies 1 and 2, which face each other, is formed of a first pressing portion 3, a resin-molding portion 5, and a second pressing portion 4. The first pressing portion 3 is arranged upstream of the resin-molding portion 5 in the direction in which the metal plate M is conveyed. The resin-molding portion 5 is arranged between the first pressing portion 3 and the second pressing portion 4. The second pressing portion 4 is arranged downstream of the resin-molding portion 5 in the direction in which the metal plate M is conveyed. The first pressing portion 3, the resin-molding portion 5 and the second pressing portion 4 are directly fixed to the same plane. The first pressing portions 3, the resin-molding portions 5 and the second pressing portions 4 of the first die and the second die function as a single forming die, that is, they operate together with each other during a pressing and injection-molding process.

The metal plate M is pressed and a resin-molded portion is formed on the metal plate M by the upper die 2 and the lower die 1 at regular intervals in the longitudinal direction of the metal plate M so that multiple molded products are successively processed and formed. Therefore, as shown in FIG. 2B, the forming device P is provided with a metal plate delivery device 6 that delivers the metal plate M into the die by a predetermined length. In the embodiment of the invention, the metal plate delivery device 6 operates using air as a drive power source. The delivery timing is controlled based on a signal (voltage) from the forming device P. The metal plate M is delivered intermittently from the left side toward the right side in FIG. 2 at regular intervals.

A resin material injection hole 8 is formed at a center portion of the movable die 2. The resin material injection hole 8 provides communication between a resin material supply device 7, which is provided above the forming device P, and the resin-molding portion 5. The resin material that is supplied to the resin material supply device 7 is delivered from the resin dryer T. The resin material is injected into the resin-molding portion 5 through the resin material injection hole 8 in accordance with a downward movement of the movable die 2, whereby the resin material is integrated with the metal plate M, that is, the resin-molded portion is formed on the metal plate M.

Next, an example of a method for forming metal-resin molded products using the forming apparatus provided with a multifunction die according to the embodiment of the invention will be described. Metal-resin molded products are produced by the forming apparatus based on a hoop forming process. The hoop forming process includes a pressing process in which the metal plate M is punch-pressed, bent, etc. by the first pressing portion 3, an injection-molding process in which the resin-molded portion is formed on the metal plate M by the resin-molding portion 5 arranged between the first pressing portion 3 and the second pressing portion 4, and a pressing process in which the metal plate M is punch-pressed, bent, etc. by the second pressing portion 4.

As shown in FIGS. 3A and 3B, at the first pressing portion 3 that is positioned on the upstream side in the direction in which the metal plate M is conveyed, various processes such as punch-pressing, bending, twisting, swaging are performed on the metal plate M. Holes 9, which are used to determine a predetermined delivery amount of the metal plate M, are formed in the metal plate M at end portions that are opposed to each other in the direction in which the short-sides of the metal plate M extend. Then, a first punching process 10 is performed on the metal plate M as a step toward formation of a molded product. In the first punching process 10, adhesion enhancement portions 11 such as small holes are formed in order to enhance the degree of adhesion between the metal plate M and the resin when resin bridges are formed in a downstream process. The adhesion enhancement portions 11 may be appropriately formed recesses or indentations instead of small holes.

Next, a second punching process 12 is performed on the metal plate M as a step toward formation of the molded product. In the second punching process 12, metal bridges 13 that are used to connect the molded products with the metal plate M are formed in part of the metal plate 13. Then, in the embodiment of the invention, a right-angle bending process 14 is performed as a step toward formation of the molded product. After that, a third punching process 15 is performed as a step toward formation of the molded product. In the third punching process 15, part of the metal bridges 13 are punch-pressed.

After various processes are performed on only the metal portions, resin-molded portions are formed on the metal portions. At this time, the resin is firmly integrated with the metal plate M and resin bridges 16 are formed in such a manner that the adhesion enhancement portions 11 formed in the metal plate M are covered with the resin. In each adhesion enhancement portion 11, a resin layer that passes through the metal plate M from one face to the other face is formed. Thus, the molded product that is formed of metal and resin, and the resin bridges 16 are formed. In this process, there are both the metal bridges 13 and the resin bridges 16.

As shown in FIG. 3D, each resin bridge 16 is provided with a projection/recess portion or projection rib 17 that is used to reinforce the resin bridge 16 and prevent the molded product from dropping off from the metal plate M.

In the above-described process, the temperature controller V is operated so that the entirety of the forming die is warmed by circulating warm water to a temperature that is set appropriately based on the type of resin. When, for example, nylon is used, warm water having a temperature approximately 80° C. is used. Thus, even if a thick resin portion needs to be formed, the injection-molding process is completed within approximately 3 seconds to approximately 10 seconds. An idling process 18 may be performed after the injection-molding process is completed to secure sufficient time to cool the resin portions. Thus, a cycle time is reduced. In the injection-molding process, the hot runner controller H shown in FIG. 1 is operated to suppress formation of runner (unnecessary solidified-resin) in the resin-molding portion.

At the second pressing portion 4 that is downstream of the resin-molding portion 5 in the direction in which the metal plate M is conveyed, various final processes such as punch-pressing, bending, twisting, and swaging are performed. First, the metal bridges 13 are cut off in a cutting process 19, whereby only the resin bridges 16 are left. Then, various processes such as bending, twisting, and swaging are performed to obtain the molded product. If the metal bridges 13 are not removed, the above-described various processes are not performed efficiently on the metal portions due to the presence of the metal bridges 13. In the embodiment of the invention, a right-angle bending process 20 is performed as a step for formation of the molded product.

In the embodiment of the invention, a cutting process 21 is performed on some resin portions that are the resin bridges 16 after the right-angle bending process 20. In this way, the molded product, in which the metal and the resin are integrated with each other and the metal is formed in a predetermined shape, is produced. At this time, residual metal portions that are left after the molded product is punched out and part of resin bridges 16 are left in the metal plate M. That is, resin adheres to part of the metal plate M that is left after the molded product is cut off. If only the resin portions are removed from the residual metal portions of the metal plate M, the residual metal portions that are free from admixture of resin may be reused.

Part of the resin bridges 16 left on the metal plate M and part of the metal plate M may be punch-pressed in order to remove the resin portions from the metal plate M. Because only a small amount of resin adheres to the faces of the metal plate M, the resin portions are removed easily. Especially, when the adhesion enhancement portions 11 are U-shaped grooves or indentations as shown in FIG. 3C, the resin that are left on the metal plate M is removed by sliding the resin toward the center of the metal plate M in the direction in which the short-sides of the metal plate M extend.

What is claimed is:

1. A forming apparatus provided with a pressing and injection-molding multifunction die that forms a metal-resin molded product, the apparatus comprising:

a first pressing portion that forms, in a metal member, a main body portion and a metal bridge portion that maintains a connection between the main body portion and a residual metal portion of the metal member;

a resin-molding portion that is arranged downstream of the first pressing portion in a direction in which the metal member is conveyed, that is configured to integrate the main body portion with the resin and that is configured to form a resin bridge portion that connects the main body portion to the residual metal portion of the metal member; and a second pressing portion that is arranged downstream of the resin-molding portion in the direction in which the metal member is conveyed, and that cuts the metal bridge portion, while maintaining the resin bridge portion so that the main body portion is connected to the residual metal portion of the metal member only by the resin bridge portion, wherein the second pressing portion is configured to perform, after the metal bridge is cut, at least one of a pressing process and an injection-molding process on the metal member in a state in which the metal-resin molded product is connected to the residual member portion, wherein the residual member portion is a portion of the metal member, which does not form the metal-resin molded product, only by the resin bridge portion.

2. The forming apparatus according to claim 1, wherein a resin injection hole, through which the resin is injected into a forming die, is formed in a center portion of the forming die, at which the resin-molding portion is arranged.

3. The forming apparatus according to claim 1, further comprising:
   a temperature controller that controls a temperature of an entirety of the forming die that includes the resin-molding portion.

4. The forming apparatus according to claim 1, further comprising:
   a hot runner controller that suppresses occurrence of runner in the resin-molding portion.

* * * * *